United States Patent
Chiu et al.

(10) Patent No.: US 8,723,835 B2
(45) Date of Patent: May 13, 2014

(54) TOUCH-SENSING DISPLAY PANEL, TOUCH PANEL, TOUCH-SENSING DEVICE AND TOUCH-SENSING CIRCUIT

(75) Inventors: Hao-Lin Chiu, Taipei (TW); Chun-Yao Huang, Hsinchu (TW); Yih-Chyun Kao, Changhua County (TW); Ya-Hsiang Tai, Hsinchu (TW); Lu-Sheng Chou, Kaohsiung (TW); Kuan-Da Lin, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 227 days.

(21) Appl. No.: 12/955,919

(22) Filed: Nov. 30, 2010

(65) Prior Publication Data
US 2012/0133607 A1 May 31, 2012

(51) Int. Cl.
*G06F 3/045* (2006.01)
(52) U.S. Cl.
USPC .......................................... 345/174
(58) Field of Classification Search
None
See application file for complete search history.

(56) References Cited

U.S. PATENT DOCUMENTS

| | | |
|---|---|---|
| 2005/0127380 A1 | 6/2005 | Kawasaki et al. |
| 2007/0069995 A1* | 3/2007 | Shin et al. ........................ 345/76 |
| 2007/0087564 A1 | 4/2007 | Speakman |
| 2008/0036751 A1 | 2/2008 | Yamazaki |
| 2008/0048995 A1 | 2/2008 | Abileah et al. |
| 2009/0040192 A1 | 2/2009 | Haga |
| 2009/0109359 A1* | 4/2009 | Shih et al. ........................ 349/38 |
| 2009/0115741 A1 | 5/2009 | Wang et al. |
| 2010/0007616 A1* | 1/2010 | Jang .............................. 345/173 |
| 2010/0103121 A1 | 4/2010 | Kim et al. |
| 2010/0141599 A1 | 6/2010 | Wang et al. |
| 2010/0163861 A1 | 7/2010 | Brazis, Jr. |
| 2010/0251936 A1 | 10/2010 | Kim et al. |
| 2010/0271327 A1 | 10/2010 | Shin et al. |
| 2011/0285617 A1* | 11/2011 | Huang et al. .................. 345/107 |
| 2011/0285641 A1* | 11/2011 | Huang ........................... 345/173 |
| 2012/0019450 A1* | 1/2012 | Huang et al. .................. 345/173 |

FOREIGN PATENT DOCUMENTS

| | | |
|---|---|---|
| CN | 1916712 | 2/2007 |
| CN | 101276252 | 10/2008 |
| CN | 101750783 | 6/2010 |
| CN | 101763202 | 6/2010 |
| TW | 200824108 | 6/2008 |
| TW | 201017952 | 2/2010 |

OTHER PUBLICATIONS

"Search Report of Europe Counterpart Application", issued on Sep. 7, 2011, p. 1-p. 6, in which the listed references were cited.
"Second Office Action of China counterpart application" issued on Apr. 24, 2013, p. 1-p. 8, in which the listed reference was cited.

* cited by examiner

*Primary Examiner* — Bipin Shalwala
*Assistant Examiner* — Yaron Cohen
(74) *Attorney, Agent, or Firm* — Jianq Chyun IP Office (57) ABSTRACT

The present application provides a touch-sensing display panel comprising a display panel and a touch-sensing device disposed above the display panel. The touch-sensing device comprises a plurality of select lines, a plurality of readout lines and a plurality of capacitive touch-sensing units arranged in array. Each of the capacitive touch-sensing units comprises a transistor and a touch-sensing pad, each of the transistors comprises a gate electrode electrically connected to one of the select lines, a source electrode electrically connected to a reference voltage, a drain electrode electrically connected to one of the readout lines, and a channel layer electrically coupled to the touch-sensing pad.

30 Claims, 10 Drawing Sheets

TOUCH-SENSING DISPLAY PANEL, TOUCH PANEL, TOUCH-SENSING DEVICE AND TOUCH-SENSING CIRCUIT

BACKGROUND OF THE INVENTION

1. Field of the Invention

The present invention generally relates to a touch-sensing circuit, and more particularly, relates to a touch-sensing device and a touch panel with high transmittance and favorable sensitivity.

2. Description of Related Art

In recent years, with continuous progress of image display technique, since a touch-sensing display panel has an advantage of conducting input directly through a touch operation, it has become a commonly used display device in the market, and is widely applied in various electronic produces such as an automatic teller machine, a terminal of a sales point, a tourist guide system, or an industrial control system, etc. Touch panels can be classified into several types such as capacitive touch panels, resistive touch panels, optical touch panels, and so on.

In the conventional touch panel, the touch-sensing circuit thereof comprises a plurality of X-sensing series and a plurality of Y-sensing series, wherein the Y-sensing series and the X-sensing series are crossover. Generally, metal bridges are used at the crossover positions and each metal bridge is electrically connected two touch-sensing pads adjacent thereto. However, visual morie phenomenon caused by the metal bridges often occurs. Additionally, when the touch-sensing circuit including the X-sensing series and the Y-sensing series are applied to large-scale display panels, the signal-noise ratio (SNR) of touch-sensing signals transmitted by the X-sensing series and the Y-sensing series deteriorate significantly, and higher electrical power is required to drive the X-sensing series and the Y-sensing series. Accordingly, sensitivity of the conventional touch panel is an important issue required to be improved.

SUMMARY OF THE INVENTION

The present application is directed to a touch-sensing display panel, a touch panel, a touch-sensing device and a touch-sensing circuit.

The present application provides a touch-sensing display panel comprising a display panel and a touch-sensing device disposed above the display panel. The touch-sensing device comprises a plurality of select lines, a plurality of readout lines and a plurality of capacitive touch-sensing units arranged in array. Each of the capacitive touch-sensing units comprises a transistor and a touch-sensing pad. Each of the transistors comprises a gate electrode electrically connected to one of the select lines, a source electrode electrically connected to a reference voltage, a drain electrode electrically connected to one of the readout lines, a channel layer electrically connected between the source electrode and the drain electrode, and a gate dielectric layer located between the gate electrode and the channel layer. The touch-sensing pad is electrically connected to the channel layer.

The present application further provides touch panel comprising a substrate, a plurality of select lines disposed on the substrate, a plurality of readout lines disposed on the substrate and a plurality of capacitive touch-sensing units disposed on the substrate and arranged in array. Each of the capacitive touch-sensing units comprises a transistor and a touch-sensing pad. Each of the transistors comprises a gate electrode electrically connected to one of the select lines, a source electrode electrically connected to a reference voltage, a drain electrode electrically connected to one of the readout lines, a channel layer electrically connected between the source electrode and the drain electrode, and a gate dielectric layer located between the gate electrode and the channel layer. The touch-sensing pad is electrically connected to the channel layer.

The present application further provides a touch-sensing device. The touch-sensing device comprises a select line, a readout line, a transistor and a touch-sensing pad. The transistor comprises a gate electrode electrically connected to the select line, a source electrode electrically connected to a reference voltage, a drain electrode electrically connected to the readout line, a channel layer electrically connected between the source electrode and the drain electrode, and a gate dielectric layer located between the gate electrode and the channel layer. Additionally, the touch-sensing pad is electrically connected to the channel layer.

The present application further provides a touch-sensing circuit. The touch-sensing circuit comprises a select line, a readout line, a transistor and a touch-sensing electrode, wherein the transistor comprises a gate electrode electrically connected to the select line, a source electrode electrically connected to a reference voltage, a drain electrode electrically connected to the readout line, and a channel layer electrically connected between the source electrode and the drain electrode. Additionally, the touch-sensing pad is electrically connected to the channel.

In the present application, since the touch-sensing pad is electrically connected to the channel layer of the transistor (e.g. an a-Si thin film transistor or an oxide semiconductor thin film transistor), touch-sensing signal is readout from the transistor when the touch-sensing pad is touched by one or more fingers of human, one stylus or other means. The transistor and the touch-sensing pad may be made of transparent materials so as to facilitate fabrication of transparent touch-sensing device with high transmittance and favorable sensitivity.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
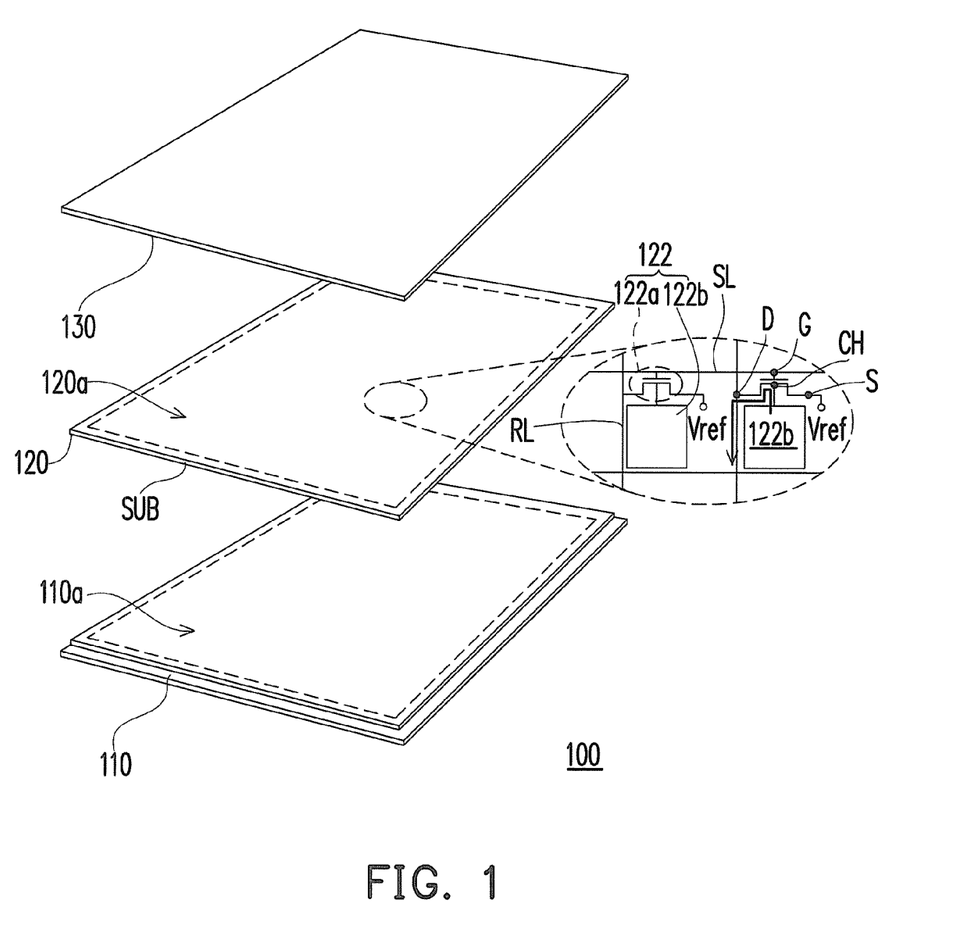
FIG. 1 is a schematic view illustrating a touch-sensing display panel according to an embodiment of present application.

FIG. 1 is a schematic view illustrating a touch-sensing display panel according to an embodiment of present application. Referring to FIG. 1, the touch-sensing display panel 100 of the present embodiment includes a display panel 110 and a touch-sensing device 120 disposed above the display panel 110. In the present embodiment, the display panel 110 is a liquid crystal display panel, a plasma display panel, an organic electroluminescent display panel, an electrophoretic display panel or an electro-wetting display panel, for example. It is noted that the touch-sensing device 120 may be formed by several processes. Specifically, on-cell type touch-sensing device or added-on type touch-sensing device may be used in the present embodiment. In other words, the touch-sensing device 120 may be formed directly on the top surface of the display panel 110 (on-cell design) or may be formed on a surface of an auxiliary substrate SUB in advance and then be attached to the surface of the display panel 110 (added-on design). The auxiliary substrate SUB having the touch-sensing device 120 formed thereon can be considered as a touch panel.

In the present embodiment, the display panel 110 has a display region 110a, and the touch-sensing device 120 has a touch-sensing region 120a corresponding the display region 110a. Specifically, the shape of the display region 110a is substantially the same as that of the touch-sensing region 120a, and the edge of the display region 110a is substantially coincided with that of the touch-sensing region 120a.

As shown in FIG. 1, the touch-sensing display panel 100 of the present embodiment may further include a cover substrate 130 for protecting the touch-sensing device 120. The touch-sensing device 120 is sandwiched between the cover substrate 130 and the display panel 110. In a modified embodiment, for example, the touch-sensing device 120 may be formed on an inner surface of the cover substrate 130, and the cover substrate 130 is a transparent substrate, such as a glass substrate or a plastic substrate. The cover substrate 130 with the touch-sensing device 120 facing to the display panel 110 may be attached to the top surface of the display panel 110. Additionally, optical films (e.g. anti-glare film, anti-reflection film, anti-scratch film, wide viewing angle film etc.) may be optionally attached on the outer surface of the cover substrate 130 to provide required functions. If the display panel 110 is a liquid crystal display panel, a polarizer film may be disposed and attached between the display panel 110 and the touch-sensing device 120.

The touch-sensing device 120 of the present embodiment is schematically shown in a touch-sensing circuit. The touch-sensing circuit includes a plurality of select lines SL, a plurality of readout lines RL and a plurality of capacitive touch-sensing units 122 arranged in array. Each of the capacitive touch-sensing units 122 includes a transistor 122a and a touch-sensing pad 122b, wherein each of the transistors 122a includes a gate electrode G electrically connected to one of the select lines SL, a source electrode S electrically connected to a reference voltage Vref, a drain electrode D electrically connected to one of the readout lines RL, and a channel CH electrically connected to the touch-sensing pad 122b.

During operation of the touch-sensing device 120, a reversed bias can be applied to the transistor 122a. For example, the reference voltage Vref (e.g. −5V) is applied to the source electrode S, a negative direct current (DC) voltage (e.g. −10V or −15V) is applied to the plurality of readout lines RL, and a negative pulse DC signal (e.g. 5V/−10V) is sequentially applied to the plurality of select lines SL. It is noted that the reference voltage Vref may be negative DC voltage or a negative pulse DC signal. In a modified embodiment, a positive DC voltage or a positive pulse DC signal can be applied to the touch-sensing device 120. When fingers of an user touch the touch-sensing pad 122b of the touch-sensing units 122, touch-sensing current caused by the fingers coupled to the touch-sensing pad 122b is conducted to the readout line RL through the channel CH (i.e. the channel layer CH) and the drain electrode D. Thereafter, the touch-sensing current transmitted by the readout line RL is processed by a sensing IC or other means. Multi-touch can be achieved when the fingers touch the touch sensing device 120 in the same time at different location.

Figure 2:
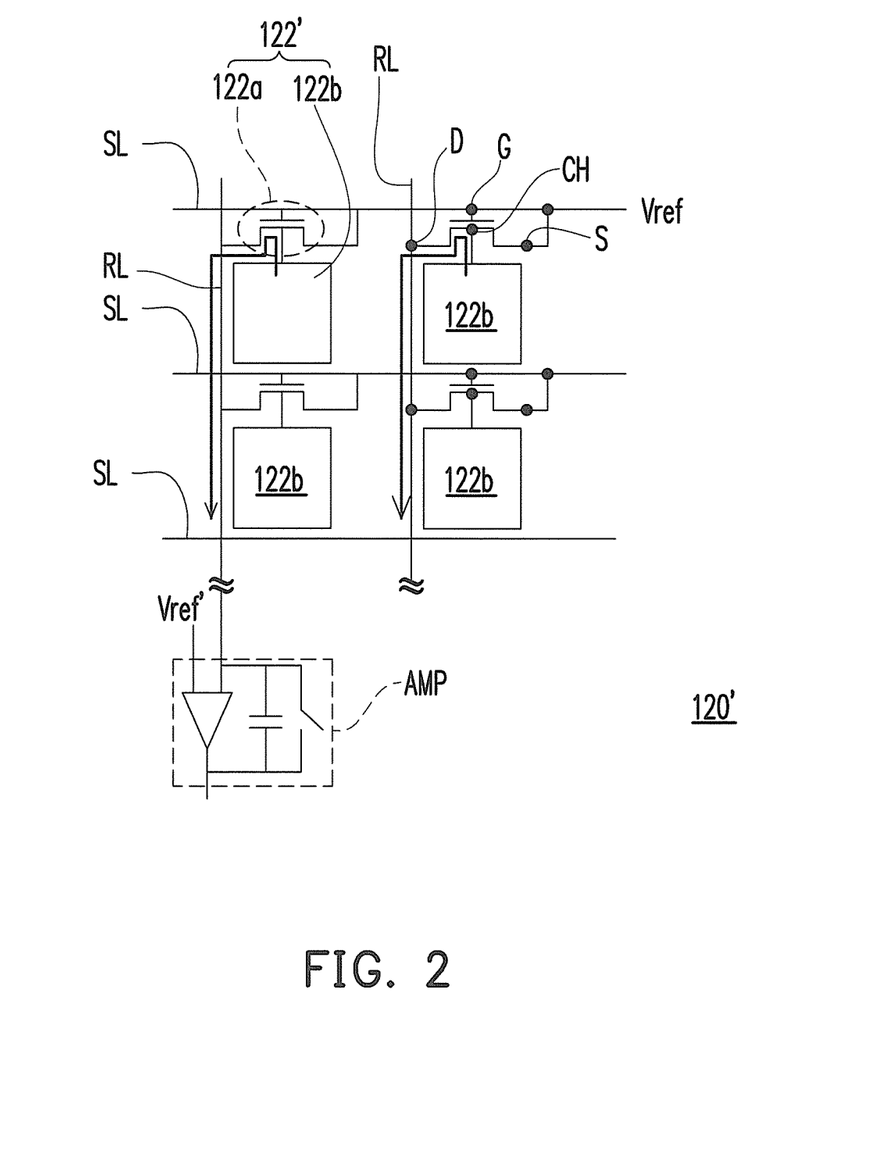
FIG. 2 is a schematic view illustrating a touch-sensing circuit according to another embodiment of present application.

FIG. 2 is a schematic view illustrating a touch-sensing circuit corresponding to a touch-sensing device 120' according to another embodiment of present application. Referring to FIG. 1 and FIG. 2, the touch-sensing device 120' in the present embodiment is similar with the touch-sensing device 120 shown in FIG. 1 except that the source electrode S in one of the capacitive touch-sensing units 122' of the present embodiment is electrically connected to the corresponding select line SL. In other words, when a negative pulse DC signal is applied to the corresponding select line SL, the negative pulse DC signal not only enables the corresponding transistors 122a but also serves as the reference voltage Vref applied to the source electrode S.

As shown in FIG. 2, when fingers of user touch at least one touch-sensing pad 122b of the touch-sensing device 120', touch-sensing current caused by the fingers is conducted to the readout line RL through the touch-sensing pad 122b, the channel CH and the drain electrode D. Thereafter, the touch-sensing current transmitted by the readout line RL is processed by a charge amplifier circuit AMP. In the present embodiment, the charge amplifier circuit AMP may be a component of a sensing IC.

Figure 3:
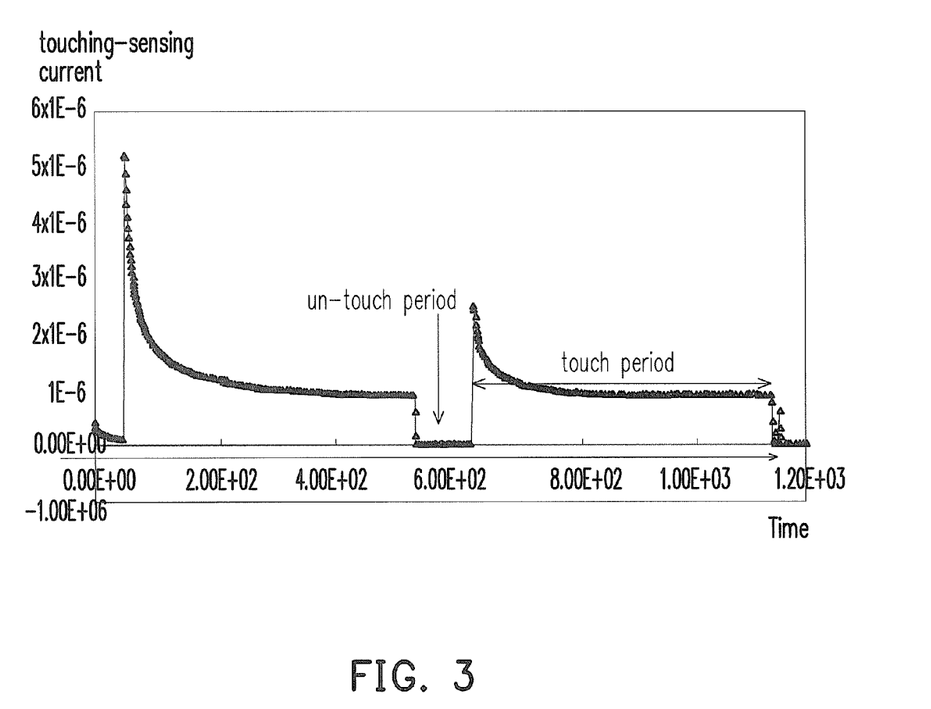
FIG. 3 is an experimental diagram showing a relationship between touch-sensing current and time during touch period and un-touch period.

FIG. 3 is an experimental diagram showing a relationship between touch-sensing current and time during touch period and un-touch period. Referring to FIG. 1 through FIG. 3, when fingers of user touch at least one touch-sensing pad 122b of the touch-sensing device 120 or 120' and the select lines SL are sequentially selected, the touch-sensing current can be easily detected. When the touch-sensing unit 122 or 122' is touched, the touch-sensing current generates and is transmitted by the corresponding readout line RL; and when the touch-sensing unit 122 or 122' is not touched, the touch-sensing current is approximately zero. As shown in FIG. 3, since the touch-sensing current ranges from $2 \times 10^{-6}$ Ampere (A) to $6 \times 10^{-6}$ Ampere (A) in accordance with the touch time of fingers, the touch-sensing current is easily recognized by the sensing IC and the touch-sensing current is sufficient to provide favorable sensing sensitivity. In addition, the signal-noise ratio (SNR) of touch-sensing signal generated from the touch-sensing device 120 or 120' of the present embodiment is good and sensitive.

Figure 4A:
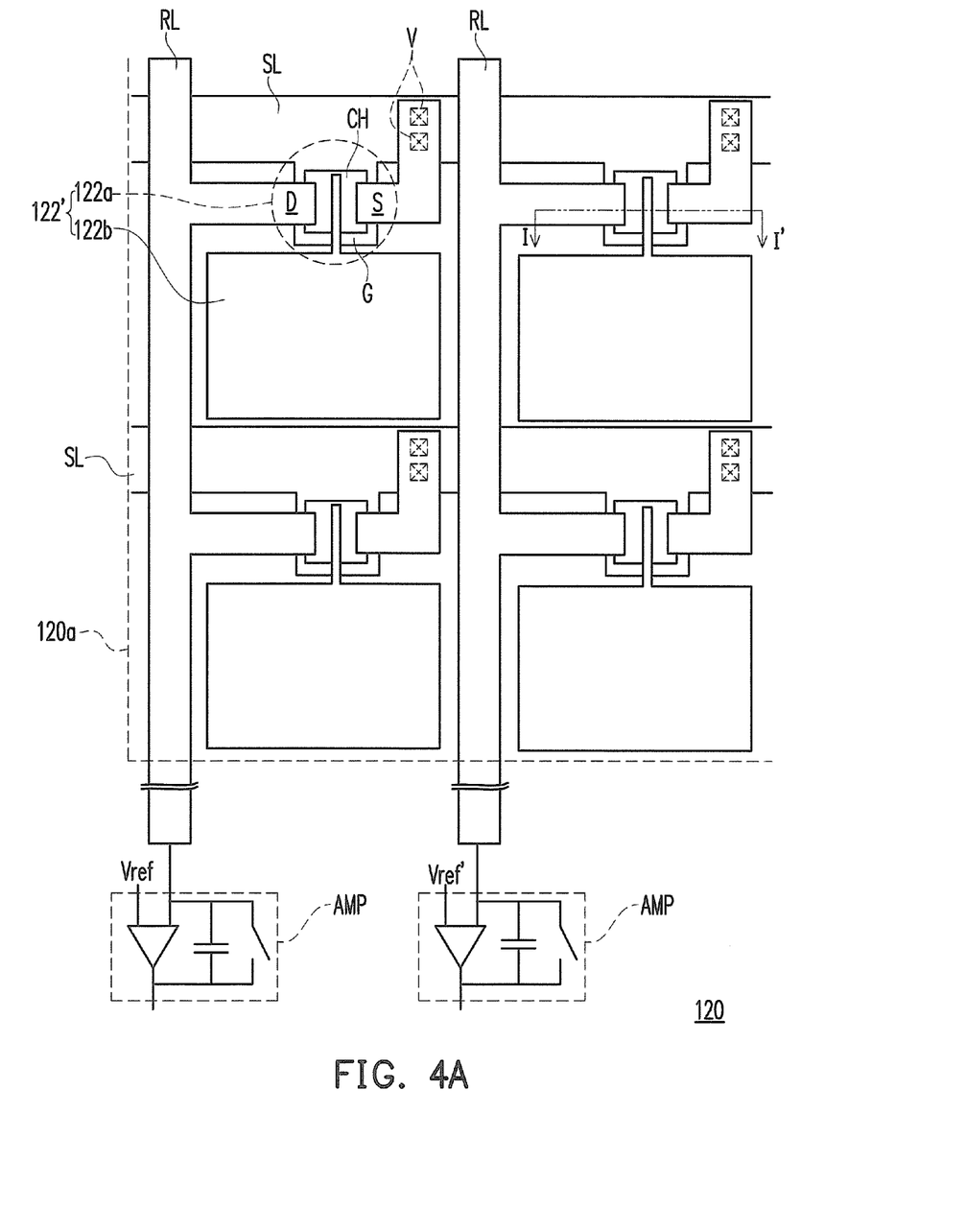
FIG. 4A is a schematic layout of a touch-sensing device according to an embodiment of present application.

FIG. 4A is a schematic layout of a touch-sensing device according to an embodiment of present application. Referring to FIG. 2 and FIG. 4A, in the touch-sensing region 120a, the touch-sensing units 122 are transparent. Specifically, the select lines SL, the readout lines RL, the transistors 122a and the touch-sensing pads 122b are made of transparent conductive materials, such as indium tin oxide (ITO), indium zinc oxide (IZO) or aluminum zinc oxide (AZO). In the present embodiment, the above-mentioned transparent materials may be define as materials having transmittance equal to or greater than 60%. For example. the select lines SL are foamed by a patterned transparent conductive oxide layer (e.g. ITO, IZO or other suitable material); the readout lines RL, the source electrodes S, the drain electrodes D and the touch-sensing pads 122b are formed by another patterned transparent conductive oxide layer (e.g. ITO, IZO or other suitable material); and the channel layer CH of the transistor 122a can be made of amorphous silicon or oxide semiconductor. In the present embodiment, the material of the oxide semiconductor may be indium gallium zinc oxide (IGZO) or other suitable materials.

Figure 4B:
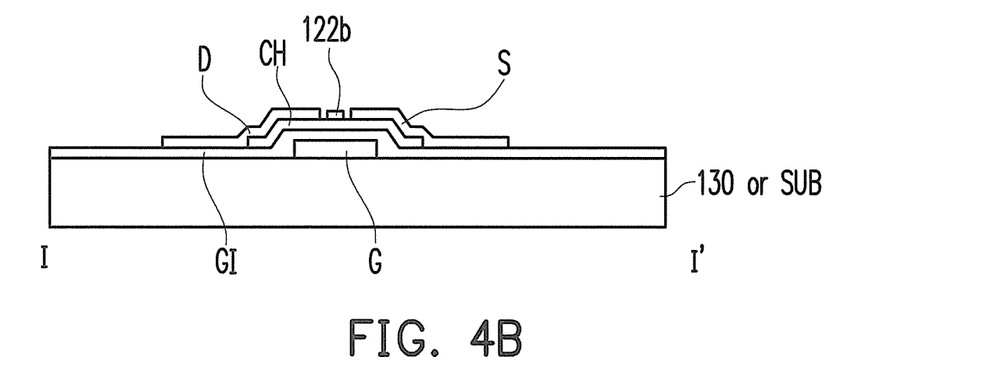
FIG. 4B is a cross-sectional view of a transistor of a touch-sensing device according to an embodiment of present application.

As shown in FIG. 4A, the source electrode S of the transistor 122a is electrically connected to the corresponding select line SL through at least one contact via V in a dielectric layer (e.g. gate dielectric layer GI) sandwiched between the source electrode S and the select line SL. Additionally, in each touch-sensing unit 122', the touch-sensing pad 122b has a touch-sensing portion and an extending portion. The extending portion of the touch-sensing pad 122b extends over and is in contact with an upper surface of the channel layer CH, and the channel layer CH is above the gate electrode G, for example. The channel layer CH is connected between the source electrode S and the drain electrode D. The gate dielectric layer GI is located between the channel layer CH and the gate electrode G. In other words, the transistor 122a has bottom-gate transistor design, as shown in FIG. 4B. Certainly, transistors having top-gate transistor design or coplanar transistor design may also be applied to the modified embodiments with suitable modifications.

It should be noted that, in order to enhance performance of the touch-sensing unit 122 or 122', metal wirings or other conductive wirings (fan-out wirings) with excellent conductivity and electrically connected to the select lines SL as well as the readout lines RL may be formed on an area outside the touch-sensing region 120a.

Figure 5:
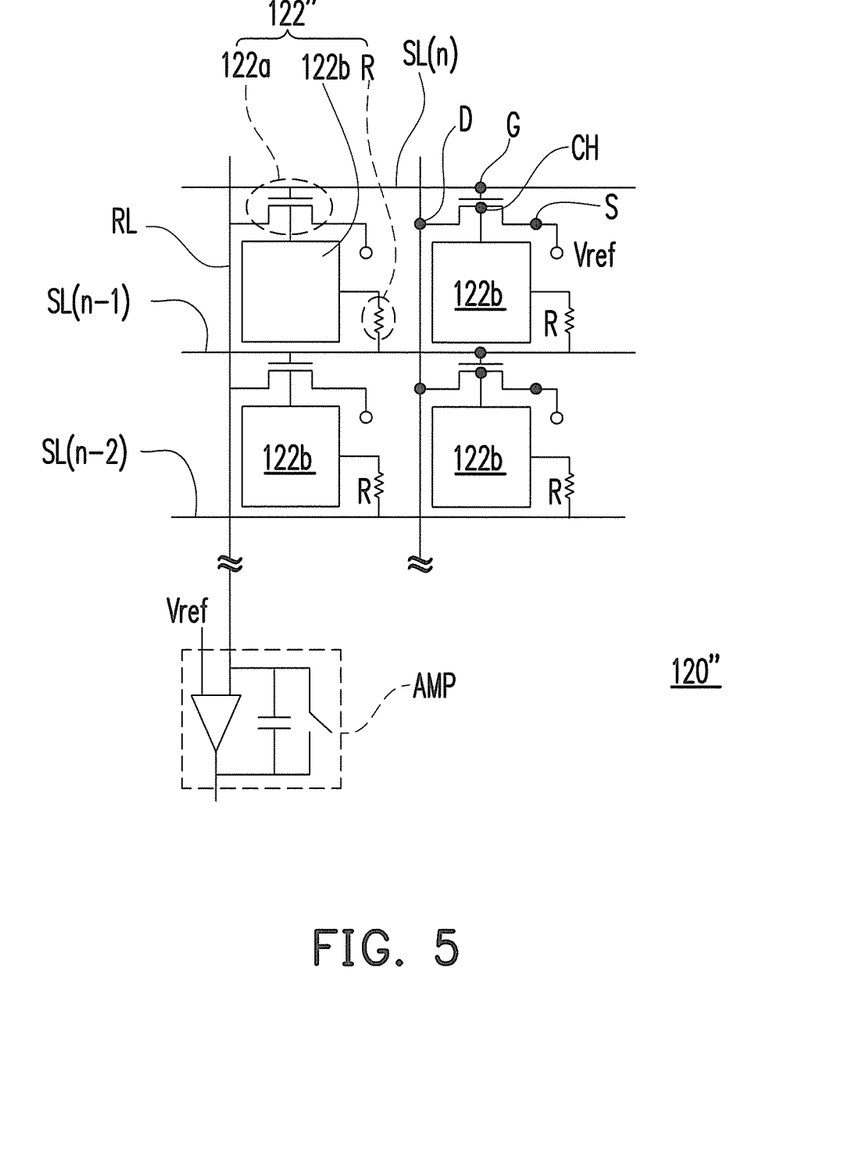
FIG. 5 is another schematic view illustrating a touch-sensing circuit according to another embodiment of present application.

FIG. 5 is another schematic view illustrating a touch-sensing circuit corresponding to a touch-sensing device according to another embodiment of present application. Referring to FIG. 1 and FIG. 5, the touch-sensing device 120" in the present embodiment is similar with the touch-sensing device 120 shown in FIG. 1 except that each of the capacitive touch-sensing units 122" of the touch-sensing device 120" further includes a resistor R electrically connected to the touch-sensing pad 122b. In addition, the resistor R is electrically connected between the touch-sensing pad 122b and a reference line. In the embodiment, the reference line can be the previous select line SL(n−1).

Figure 6:
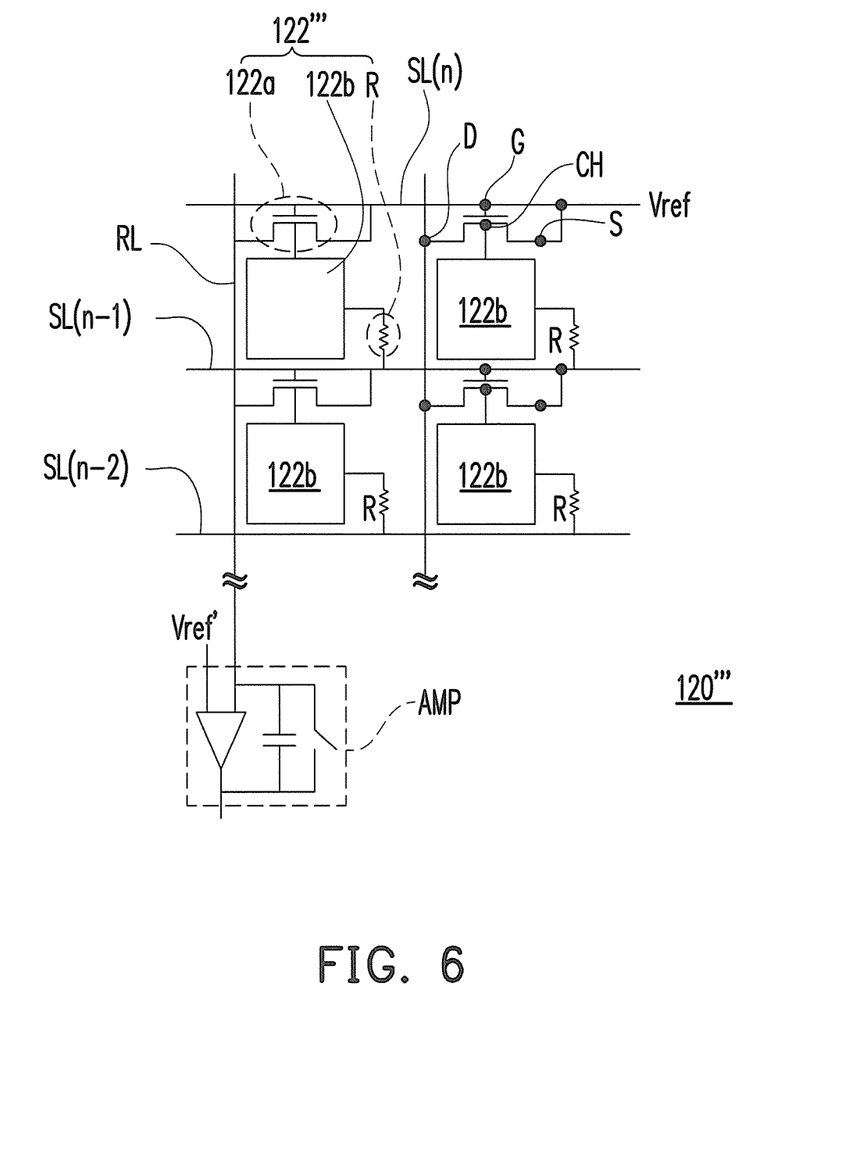
FIG. 6 is still another schematic view illustrating a touch-sensing device according to another embodiment of present application.

FIG. 6 is still another schematic view illustrating a touch-sensing circuit corresponding to a touch-sensing device according to another embodiment of present application. Referring to FIG. 2 and FIG. 6, the touch-sensing device 120''' in the present embodiment is similar with the touch-sensing device 120' shown in FIG. 1 except that each of the capacitive touch-sensing units 122''' of the touch-sensing device 120''' further includes a resistor R electrically connected to the touch-sensing pad 122b. In addition, the resistor R is electrically connected between the touch-sensing pad 122b and a reference line such as the previous select line SL(n−1).

Figure 7:
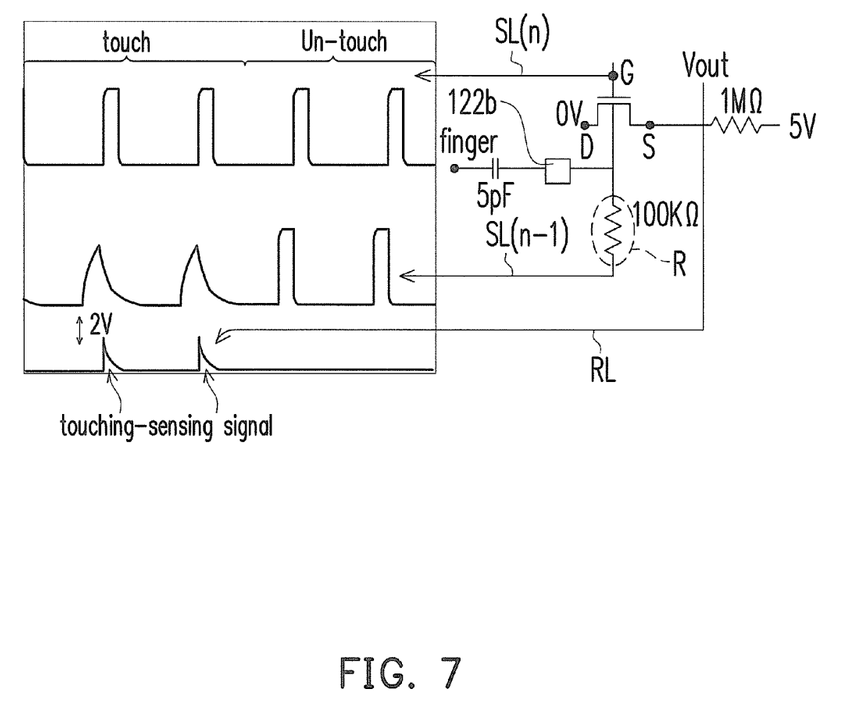
FIG. 7 shows the pulse direct current signal applied to select line SL(n) and select line SL(n−1) and the touch-sensing signal being transmitted by the readout line RL.

FIG. 7 shows the negative pulse DC signal applied to select line SL(n) and select line SL(n−1) and the touch-sensing signal transmitted by the readout line RL. Referring FIG. 7, when fingers of user touch the touch-sensing pad 122b, a touch-sensing capacitance about 5 pF (pico-Faraday) is coupled and generated between the fingers and the touch-sensing pad 122b. In the present embodiment, the negative pulse DC signal (13V, −10V) is applied to the select line SL(n−1) and the select line SL(n) sequentially, the resistor R is about 100 K Ω. When the select line SL(n−1) is selected and the touch-sensing pad 122b is touched by fingers, the negative pulse DC signal applied to the select line SL(n−1) is affected by capacitance effect resulted from fingers, and then a touch-sensing signal can be readout by the readout line RL when the select line SL(n) is selected and the touch-sensing pad 122b is touched by fingers. Since the touch-sensing pad 122b is directly connected to the channel layer CH, the effective voltage to the channel layer CH is increased when the fingers coupled to the touch-sensing pad 122b. Therefore, the effective voltage to the channel layer CH during touch period is larger than that during un-touch period. In the contrary, when the select line SL(n−1) and the select line SL(n) are respectively selected and the touch-sensing pad 122b is not touched by fingers, the negative pulse DC signal sequentially applied to the select line SL(n−1) and the select line SL(n) is not affected by capacitance effect resulted from fingers, and no touch-sensing signal can be readout by the readout line RL, accordingly. Therefore, the electrical power for sequentially applied to the select lines SL in the touch-sensing device 120 is much lower than that compared to a conventional touch panel having X-sensing series and the Y-sensing series.

Figure 8:
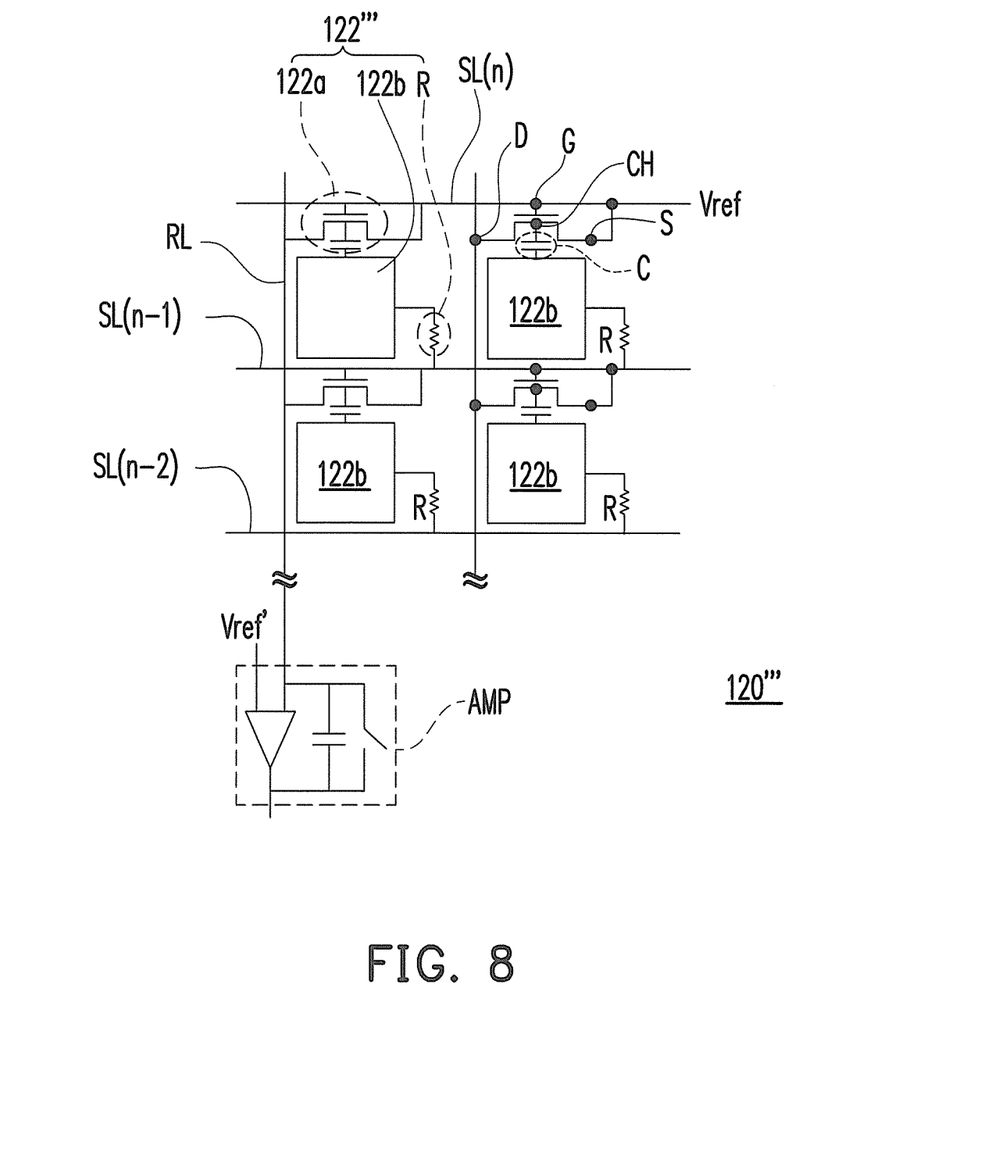
FIG. 8 is still another schematic view illustrating a touch-sensing device according to another embodiment of present application.

FIG. 8 is another schematic view illustrating a touch-sensing circuit corresponding to a touch-sensing device according to another embodiment of present application. Referring to FIG. 6 and FIG. 8, the touch-sensing device 120''' in the present embodiment is similar with the touch-sensing device 120''' shown in FIG. 6. a sensing capacitor C is electrically connected between the channel CH (i.e. the channel layer CH) and the touch-sensing electrode (i.e. the touch-sensing pad 122b). The touch-sensing electrode is electrically coupled to the channel CH through the sensing capacitor C. The sensing capacitor C provides a stable effective voltage to the channel CH. A resistor R is electrically connected to the touch-sensing electrode. In addition, the resistor R is electrically connected between the touch-sensing electrode and a reference line such as the previous select line SL(n−1).

Figure 9:
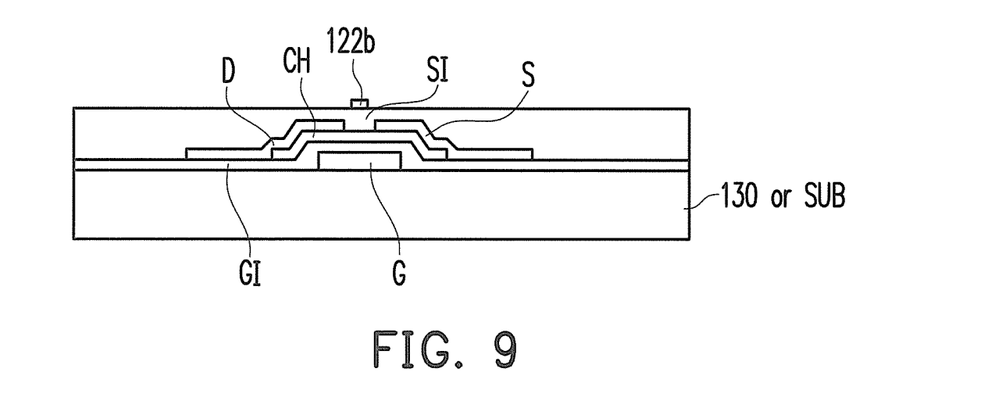
FIG. 9 is a cross-sectional view of a transistor of a touch-sensing device according to an embodiment of present application.

The schematic layout of a touch-sensing device corresponding to the embodiment in FIG. 8 can be the same as in FIG. 4A. FIG. 9 is a cross-sectional view of a transistor of a touch-sensing device according to the embodiment corresponding to FIG. 8. As shown in FIG. 9, in each touch-sensing unit, the channel layer CH is connected between the source electrode S and the drain electrode D. The gate dielectric layer GI is located between the channel layer CH and the gate electrode G. The channel layer CH is located above the gate electrode G, for example. The extending portion of the touch-sensing pad 122b extends over an upper surface of the channel layer CH. A sensing dielectric layer SI is located between the channel layer CH and the touch-sensing pad 122b. Therefore, the sensing dielectric layer SI forms a capacitor corresponding to the sensing capacitor C in FIG. 8. The touch-sensing pad 122b is electrically coupled to the channel layer CH through the sensing dielectric layer SI. Certainly, transistors may have top-gate transistor design or coplanar transistor design in modified embodiments.

Since the touch-sensing pad is electrically connected to the channel layer of the transistor in the touch-sensing unit of the touch-sensing device of the present invention, the touch-sensing unit has a favorable sensitivity and a high perfoii ance. In addition, in parts embodiments of the present invention, since the select lines, the readout lines, the transistors and the touch-sensing pads can be made of transparent materials, the touch-sensing device is transparent and visual morie phenomenon for a touch display panel can be eliminated.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch-sensing display panel, comprising:
    a display panel; and
    a touch-sensing device disposed above the display panel, the touch-sensing device comprising:
        a plurality of select lines;
        a plurality of readout lines; and
        a plurality of capacitive touch-sensing units arranged in array, each of the capacitive touch-sensing units comprising a transistor and a touch-sensing pad, each of the transistors comprising a gate electrode, a source electrode, a drain electrode, a gate dielectric layer and a channel layer, the gate electrode being electrically connected to one of the select lines correspondingly, the source electrode being electrically connected to a reference voltage, the drain electrode being electrically connected to one of the readout lines correspondingly, and the channel layer being electrically connected between the source electrode and the drain electrode, the gate dielectric layer being located between the gate electrode and the channel layer, the touch-sensing pad made of a conductive material being electrically coupled and directly connected to the channel layer, and the touch-sensing pad being not directly contacted the source electrode and the drain electrode and spaced apart from the source electrode and the drain electrode with a gap.

2. The touch-sensing display panel according to claim 1, wherein the display panel comprises a liquid crystal display panel, a plasma display panel, an organic electroluminescent display panel, an electrophoretic display panel or an electrowetting display panel.

3. The touch-sensing display panel according to claim 1, further comprising an auxiliary substrate, wherein the touch-sensing device is disposed on a surface of the auxiliary substrate.

4. The touch-sensing display panel according to claim 1, further comprising a cover substrate, wherein the touch-sensing device is disposed between the cover substrate and the display panel.

5. The touch-sensing display panel according to claim 4, wherein the touch-sensing device is disposed on an inner surface of the cover substrate.

6. The touch-sensing display panel according to claim 1, wherein the touch-sensing device is disposed on a top surface of the display panel.

7. The touch-sensing display panel according to claim 1, wherein each of the source electrodes is electrically connected to one of the select lines correspondingly.

8. The touch-sensing display panel according to claim 1, wherein the display panel has a display region, the touch-sensing device has a touch-sensing region corresponding the display region, and in the touch-sensing region, the select lines, the readout lines and the transistors are transparent.

9. The touch-sensing display panel according to claim 1, wherein a material of the channel layer comprises indium gallium zinc oxide.

10. The touch-sensing display panel according to claim 1, wherein the touch-sensing pad extends over and is in contact with an upper surface of the channel layer, and the channel layer is above the gate electrode.

11. The touch-sensing display panel according to claim 1, wherein further comprising a plurality of resistors and a plurality of reference lines, wherein each of the resistor is electrically connected between one of the touch-sensing pads and one of the reference line correspondingly.

12. A touch panel, comprising:
    a substrate;
    a plurality of select lines disposed on the substrate;
    a plurality of readout lines disposed on the substrate; and
    a plurality of capacitive touch-sensing units disposed on the substrate and arranged in array, each of the capacitive touch-sensing units comprising a transistor and a touch-sensing pad, each of the transistors comprising a gate electrode, a source electrode, a drain electrode, a gate dielectric layer and a channel layer, the gate electrode being electrically connected to one of the select lines correspondingly, the source electrode being electrically connected to a reference voltage, the drain electrode being electrically connected to one of the readout lines correspondingly, and the channel layer being electrically connected between the source electrode and the drain electrode, the gate dielectric layer being located between the gate electrode and the channel layer, the touch-sensing pad made of a conductive material being electrically coupled and directly connected to the channel layer and the touch-sensing pad being not directly contacted the source electrode and the drain electrode and spaced apart from the source electrode and the drain electrode with a gap.

13. The touch panel according to claim 12, wherein the source electrode in one of the capacitive touch-sensing units is electrically connected to one of the select lines.

14. The touch panel according to claim 12, wherein the select lines, the readout lines and the transistors are transparent.

15. The touch panel according to claim 12, wherein a material of the channel layer comprises indium gallium zinc oxide.

16. The touch panel according to claim 12, wherein the touch-sensing pad extends over and is in contact with an upper surface of the channel layer, and the channel layer is above the gate electrode.

17. The touch panel according to claim 12, wherein further comprising a plurality of resistors and a plurality of reference lines, wherein each of the resistor is electrically connected between one of the touch-sensing pads and one of the reference line correspondingly.

18. A touch-sensing device, comprising:
a select line;
a readout line;
a transistor, comprising a gate electrode, a source electrode, a drain electrode, a gate dielectric layer and a channel layer, the gate electrode being electrically connected to the select line, the source electrode being electrically connected to a reference voltage, the drain electrode being electrically connected to the readout line, the channel layer being electrically connected between the source electrode and the drain electrode, the gate dielectric layer being located between the gate electrode and the channel layer; and
a touch-sensing pad, made of a conductive material and being electrically coupled and directly connected to the channel layer, and the touch-sensing pad being not directly contacted the source electrode and the drain electrode and spaced apart from the source electrode and the drain electrode with a gap.

19. The touch-sensing device according to claim 18, wherein the source electrode is electrically connected to the select line.

20. The touch-sensing device according to claim 18, wherein the select line, the readout line and the transistor are transparent.

21. The touch-sensing device according to claim 18, wherein a material of the channel layer comprises amorphous silicon or oxide semiconductor.

22. The touch-sensing device according to claim 18, wherein a material of the channel layer comprises indium gallium zinc oxide.

23. The touch-sensing device according to claim 18, wherein the touch-sensing pad extends over and is in contact with an upper surface of the channel layer, and the channel layer is above the gate electrode.

24. The touch-sensing device according to claim 18, further comprising a resistor and a reference line, wherein the resistor is electrically connected between the touch-sensing pad and the reference line.

25. A touch-sensing circuit, comprising:
a select line;
a readout line;
a transistor, comprising a gate electrode, a source electrode, a drain electrode and a channel, the gate electrode being electrically connected to the select line, the source electrode being electrically connected to a reference voltage, the drain electrode being electrically connected to the readout line, the channel electrically connected between the source electrode and the drain electrode; and
a touch-sensing electrode, being electrically coupled and directly connected to the channel, and touch-sensing electrode being not directly electrically connected to the source electrode and the drain electrode and spaced apart from the source electrode and the drain electrode with a gap.

26. The touch-sensing circuit according to claim 25, wherein the source electrode is electrically connected to the select line.

27. The touch-sensing circuit according to claim 25, further comprising a resistor and a reference line, wherein the resistor is electrically connected between the touch-sensing electrode and the reference line.

28. The touch-sensing device according to claim 1, wherein touch-sensing pad is not directly electrically connected to the source electrode and the drain electrode.

29. The touch-sensing device according to claim 18, wherein touch-sensing pad is not directly electrically connected to the source electrode and the drain electrode.

30. The touch panel according to claim 12, wherein touch-sensing pad is not directly electrically connected to the source electrode and the drain electrode.

* * * * *